US012798016B2

(12) United States Patent

Xu et al.

(10) Patent No.: US 12,798,016 B2

(45) Date of Patent: Nov. 17, 2026

(54) WORKTABLE FOR CUTTING MONOCRYSTALLINE SILICON WAFER, PARTICULARLY WORKTABLE HAVING ROTATABLE TABLE

(71) Applicant: TCL ZHONGHUAN RENEWABLE ENERGY TECHNOLOGY CO., LTD., Tianjin (CN)

(72) Inventors: Yilin Xu, Tianjin (CN); Rui Wu, Tianjin (CN); Zhijun Wu, Tianjin (CN); Zhengmin Cao, Tianjin (CN); Ruipeng Li, Tianjin (CN); Dawei Wang, Tianjin (CN); Yao Wan, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 620 days.

(21) Appl. No.: 18/548,076

(22) PCT Filed: Jul. 31, 2023

(86) PCT No.: PCT/CN2023/110416

§ 371 (c)(1),
(2) Date: Aug. 26, 2023

(87) PCT Pub. No.: WO2024/046001

PCT Pub. Date: Mar. 7, 2024

(65) Prior Publication Data

US 2025/0010412 A1 Jan. 9, 2025

(30) Foreign Application Priority Data

Aug. 31, 2022 (CN) ......................... 202222297233.5

(51) Int. Cl.
*B23K 37/04* (2006.01)
*B23K 26/38* (2014.01)
(Continued)

(52) U.S. Cl.
CPC .......... *B23K 37/0408* (2013.01); *B23K 26/38* (2013.01); *B23K 37/0435* (2013.01); *B23K 2101/40* (2018.08); *B23K 2103/56* (2018.08)

(58) Field of Classification Search
CPC ............ B23K 37/0408; B23K 37/0435; B23K 37/053
See application file for complete search history.

(56) References Cited

U.S. PATENT DOCUMENTS

2019/0283163 A1* 9/2019 Walther ............... B23K 1/0016
2019/0389017 A1* 12/2019 Cross ....................... B23Q 3/06
(Continued)

FOREIGN PATENT DOCUMENTS

CN 213857372 U 8/2021
CN 215038216 U 12/2021
(Continued)

OTHER PUBLICATIONS

International Search Report in International application No. PCT/CN2023/110416, mailed on Nov. 2, 2023.
(Continued)

*Primary Examiner* — Phutthiwat Wongwian
*Assistant Examiner* — Jacek Lisowski
(74) *Attorney, Agent, or Firm* — PV IP PC; Wei Te Chung

(57) ABSTRACT

A worktable for cutting a monocrystalline silicon wafer may include a worktable, a control panel is fixedly mounted on an outer wall of the worktable, a recess is formed on an upper surface of the worktable, a rotatable table is disposed in the recess, a shaft is fixedly connected to a middle portion of the rotatable table, a mounting plate is fixedly connected to each of upper and lower sides of the rotatable table, a clamper is disposed on the mounting plate, a scraper plate is disposed on each of upper and lower surfaces of the rotatable table, and the shaft is rotatably mounted in the recess in the worktable.

7 Claims, 3 Drawing Sheets

(51) Int. Cl.
*B23K 101/40* (2006.01)
*B23K 103/00* (2006.01)

(56) References Cited

U.S. PATENT DOCUMENTS

| | | | | |
|---|---|---|---|---|
| 2020/0406400 | A1* | 12/2020 | Stadler | B23K 26/0876 |
| 2021/0060691 | A1* | 3/2021 | Williams | B23K 37/0258 |
| 2021/0162554 | A1* | 6/2021 | Tao | B23K 26/0838 |
| 2022/0157638 | A1* | 5/2022 | Masuda | H10P 72/78 |

FOREIGN PATENT DOCUMENTS

| | | | |
|---|---|---|---|
| CN | 216067346 | U | 3/2022 |
| CN | 217265431 | U | 8/2022 |
| CN | 218487490 | U | 2/2023 |
| EP | 0007228 | A1 | 1/1980 |

OTHER PUBLICATIONS

Written Opinion of the International Search Authority in International application No. PCT/CN2023/110416, mailed on Nov. 2, 2023.

* cited by examiner

WORKTABLE FOR CUTTING MONOCRYSTALLINE SILICON WAFER, PARTICULARLY WORKTABLE HAVING ROTATABLE TABLE

CROSS-REFERENCE TO RELATED APPLICATION

The present disclosure claims priority to and the benefit of Chinese Patent Application No. 202222297233.5, filed in the China National Intellectual Property Administration on Aug. 31, 2022, the disclosure of which is hereby incorporated by reference in its entirety.

TECHNICAL FIELD

The present disclosure relates to monocrystalline silicon wafer cutting, and in particular to a worktable for cutting a monocrystalline silicon wafer.

BACKGROUND

A monocrystalline silicon wafer is one type of silicon wafer and is a good semiconductor material, and the monocrystalline silicon wafer is often used for manufacturing semiconductor devices, solar cells, and the like.

The monocrystalline silicon wafer needs to be cut into a specific shape. The laser cutting machine is commonly used in modern times. The laser cutting needs to be carried out on a worktable, and the worktable plays a role of supporting the monocrystalline silicon wafer. There are many defects in the existing worktable, and waste materials are generated during the cutting process. The waste materials are not collected, which cause a waste of resources. The existing worktable is inconvenient to collect the waste materials generated during the cutting, the waste materials stay on the surface of the worktable, and it is complicated to clean the worktable.

SUMMARY

In view of the above, according to an embodiment of the present disclosure, a worktable for cutting monocrystalline silicon wafer is provided, a control panel is fixedly mounted on an outer wall of the worktable, a recess is formed on an upper surface of the worktable, a rotatable table is disposed in the recess, a shaft is fixedly connected to the middle portion of the rotatable table, each of upper and lower sides of the rotatable table is fixedly connected with a mounting plate, a clamper is disposed on the mounting plate, and each of upper and lower surfaces of the rotatable table is provided with a scraper plate.

In some embodiment of the present disclosure, the shaft is rotatably mounted in the recess in the worktable, one end of the shaft penetrates the worktable and is fixedly connected to a rotating motor, and the rotating motor is fixedly mounted on an outside wall of the worktable.

In some embodiment of the present disclosure, the clamper includes a first screw motor, the first screw motor is fixedly mounted on a mounting plate, a first screw is fixedly connected to an output shaft of the first screw motor, the first screw motor and the first screw are both disposed in two groups, the first screw is provided with two sections of external threads, and the two sections of external threads on the first screw are in opposite spiral directions.

In some embodiment of the present disclosure, each of the two sections of external threads of the first screw is threadedly attached with a moving plate, a fixing frame is fixedly connected to a surface of the moving plate, a hydraulic cylinder is fixedly mounted onto the fixing frame, and a clamping plate is fixedly connected to an end of a hydraulic rod of the hydraulic cylinder.

In some embodiment of the present disclosure, a lower surface of the scraper plate and a surface of the rotatable table are attached to each other, and connecting blocks are fixedly connected to both sides of the scraper plate, wherein one of the connecting blocks is threadedly connected to a second screw, the second screw is rotatably mounted in the rotatable table, the second screw is fixedly connected to a second screw motor, the second screw motor is fixedly mounted on an outside wall of the rotatable table, and another of the connecting blocks is slidably connected to a limiting rod, and the limiting rod is fixedly mounted in the rotatable table.

In some embodiment of the present disclosure, the surface of the rotatable table is provided with through recesses, the connecting blocks are slidably disposed in the through recesses, and one side of the through recess is fixedly connected with a stop bar.

In some embodiment of the present disclosure, supporting legs are fixedly connected to a lower surface of the worktable, and a movable door is movably connected to one side of a lower end of the worktable.

LIST OF REFERENCE SIGNS

1. Worktable; 2. Control panel; 3. Recess; 4. Rotatable table; 5. Mounting plate; 6. Shaft; 7. Rotating motor; 8. First screw motor; 9. First screw; 10. Moving plate; 11. Fixing frame; 12. Hydraulic cylinder; 13. Clamping plate; 14. Scraper plate; 15. Connecting block; 16. Second screw; 17. Second screw motor; 18. Limiting rod; 19. Through recess; 20. Stop bar; 21. Support leg; 22. Movable door.

DETAILED DESCRIPTION

Some embodiments of the present disclosure will be described below with reference to the drawings.

Figure 1:
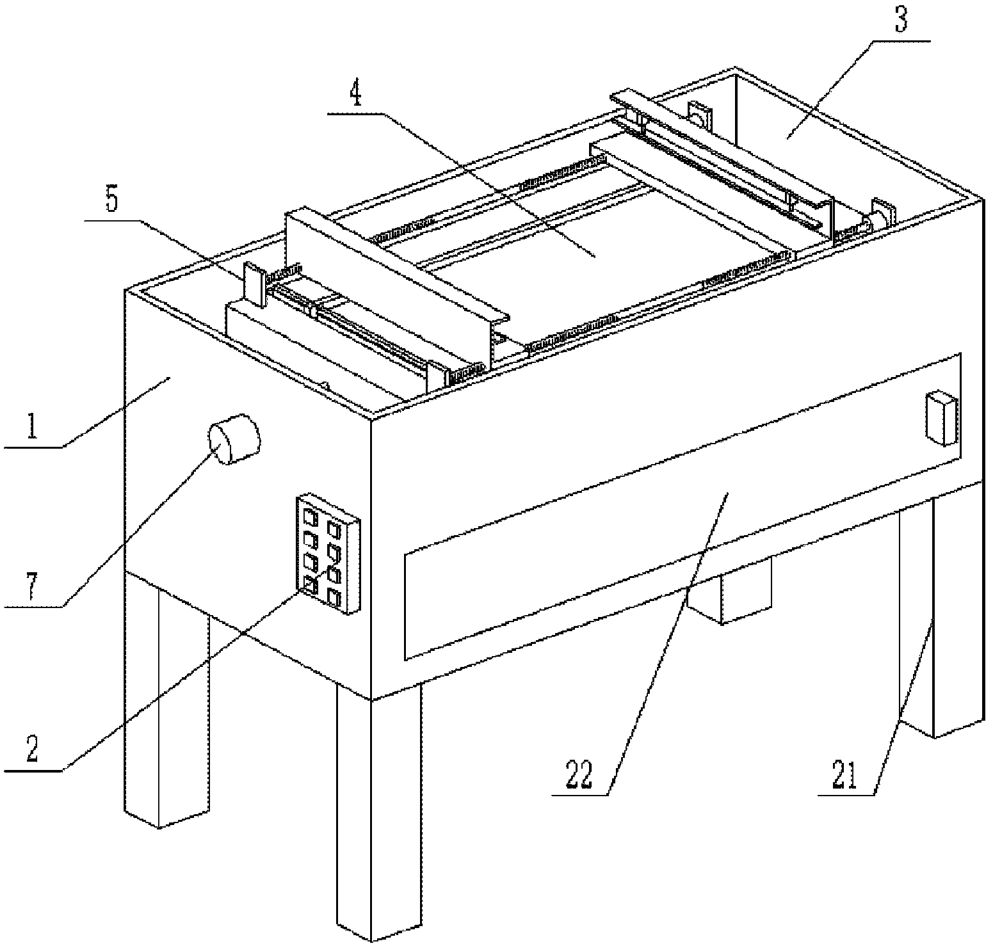
FIG. 1 is a schematic diagram of an overall structure of a worktable for cutting a monocrystalline silicon wafer according to an embodiment of the present disclosure.
Figure 2:
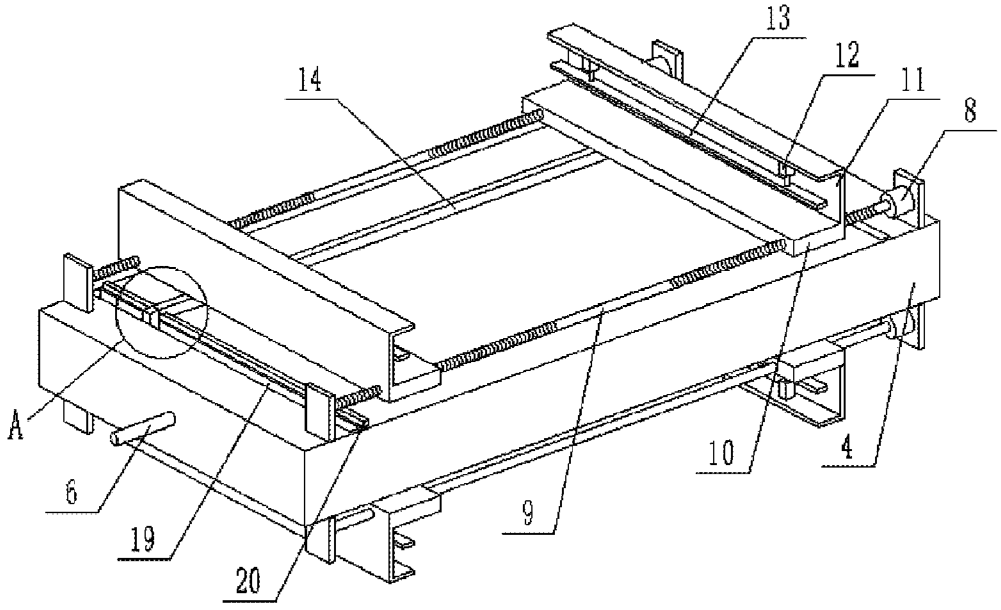
FIG. 2 is a schematic structural diagram of a rotatable table according to an embodiment of the present disclosure.
Figure 3:
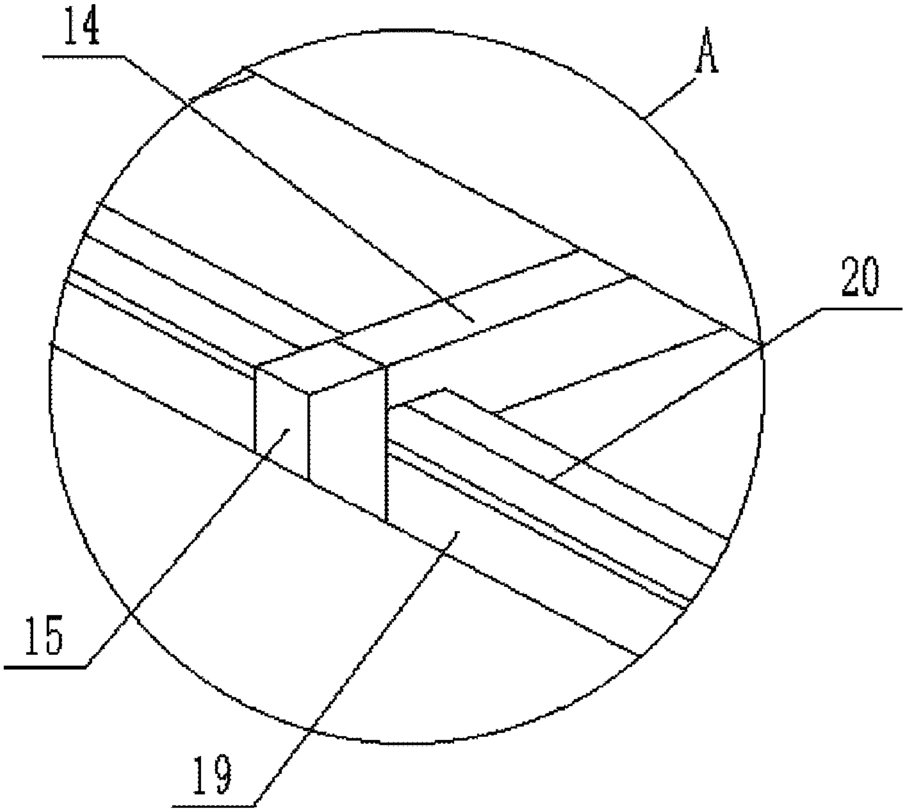
FIG. 3 is an enlarged view of part A in FIG. 2.
Figure 4:
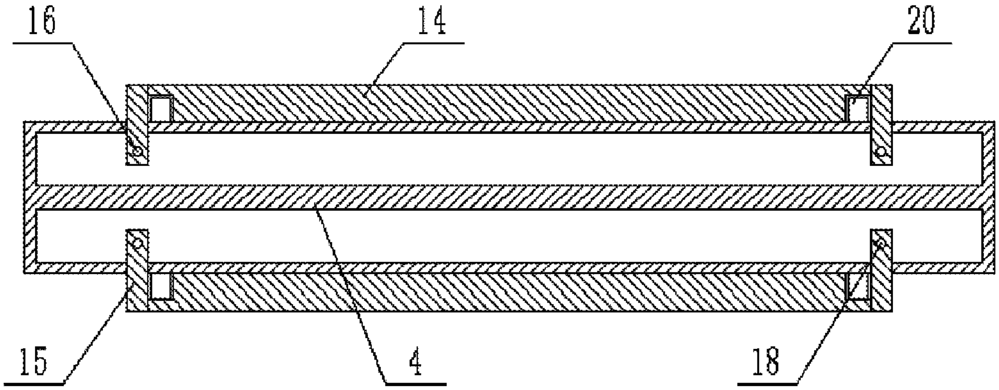
FIG. 4 is a cross sectional view of the rotatable table according to an embodiment of the present disclosure.
Figure 5:
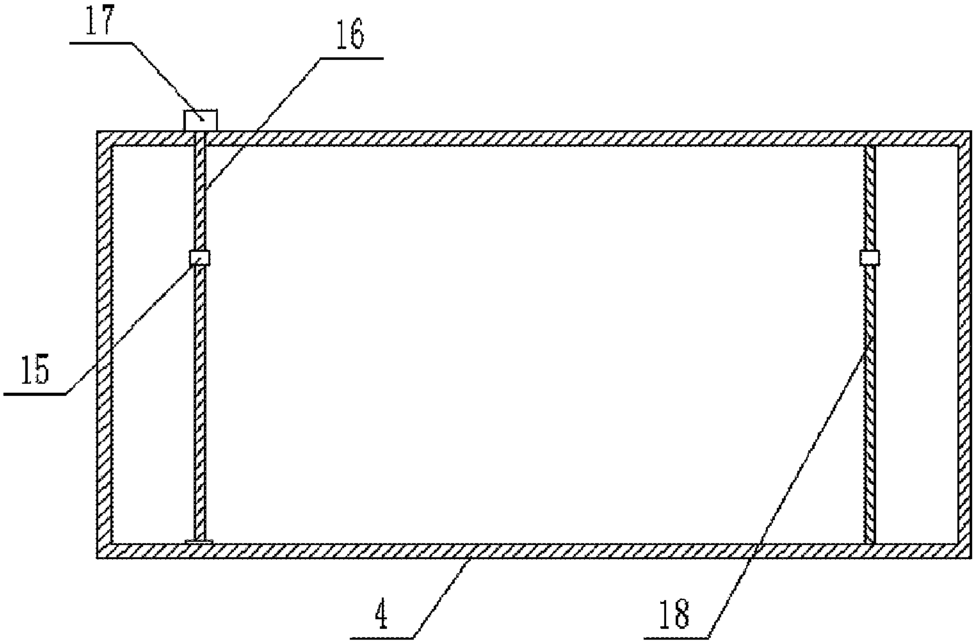
FIG. 5 is a cross sectional view of the rotatable table from another angle according to an embodiment of the present disclosure.

As shown in FIGS. 1 to 5, a worktable (or overturning worktable) 1 for cutting a monocrystalline silicon wafer, a control panel 2 is fixedly mounted on an outer wall of the worktable 1, a recess 3 is formed on an upper surface of the worktable 1, a rotatable table 4 is disposed in the recess 3, a shaft 6 is fixedly connected to a middle portion of the rotatable table 4, each of upper and lower sides of the rotatable table 4 is fixedly connected with a mounting plate 5, a clamper is disposed on the mounting plate 5, and each of upper and lower surfaces of the rotatable table 4 is provided with a scraper plate 14.

The shaft 6 is rotatably mounted in the recess 3 in the worktable 1, one end of the shaft 6 passes out from the table 1 and is fixedly connected to a rotating motor 7, the rotating motor 7 is fixedly mounted on the outer side wall of the table 1, the rotating motor 7 is controlled by the control panel 2, and the control panel 2 controls the operation of the rotating motor 7, so as to drive the shaft 6 and the rotatable table 4 to rotate.

The clamper includes a first screw motor 8, the first screw motor 8 is fixedly mounted on the mounting plate 5, a first screw 9 is fixedly connected to an output shaft of the first screw motor 8, the first screw motor 8 and the first screw 9 are both disposed in two groups, the first screw 9 is provided with two sections of external threads, two sections of external threads on the first screw 9 are screwed in opposite directions, the first screw motor 8 is controlled by a control panel 2, the control panel 2 controls the operation of the first screw motor 8, and the first screw motor 8 drives the first screw 9 to rotate.

Each of the two sections of external threads of the first screw 9 is threadedly connected with a moving plate 10, a fixing frame 11 is fixedly connected to a surface of the moving plate 10, the fixing frame 11 is fixedly connected with a hydraulic cylinder 12, an end of a hydraulic rod of the hydraulic cylinder 12 is fixedly connected to a clamping plate 13, and the hydraulic cylinder 12 is controlled by the control panel 2. Because the spiral directions of the two sections of external threads of the first screw 9 are opposite to each other, when the first screw motor 8 is operated to drive the first screw 9 to rotate, the two moving plates 10 on the first screw 9 may be brought close to each other or away from each other, and the monocrystalline silicon wafer placed on the surface of the moving plate 10 may be clamped at both sides thereof through cooperating with the fixing frame 11 on the upper moving plate 10. The control panel 2 controls the hydraulic cylinder 12 to operate, and the hydraulic cylinder 12 clamps the upper surface of the monocrystalline silicon wafer from the upper end.

A lower surface of the scraper plate 14 is attached to the surface of the rotatable table 4, and the connecting blocks 15 are fixedly connected to both sides of the scraper 14. One of the connecting blocks 15 is threadedly connected with the second screw 16, which is rotatably mounted in the rotatable table 4. The second screw 16 is fixedly connected to a second screw motor 17, which is fixedly mounted on the outside wall of the rotatable table 4. The other of the connecting blocks 15 is slidably connected to the limiting rod 18, which is fixedly connected to the rotatable table 4. The second screw motor 17 is controlled by the control panel 2, the second screw motor 17 drives the second screw 16 to rotate, under the limit of the limiting rod 18, the scraper plate 14 may slide on the surface of the rotatable table 4, thereby completely scraping the waste materials on the surface of the rotatable table 4.

Through recesses 19 are formed on the surface of the rotatable table 4, the connecting blocks 15 are slidably disposed in the through recesses 19, and a stop bar 20 is fixedly connected to one side of the through recess 19, so that the stop bar 20 may prevent debris generated by cutting from entering the inner side of the rotatable table 4 through the through recess 19.

Supporting legs 21 are fixedly connected to the lower surface of the worktable 1, and a movable door 22 is movably connected to the lower end of the worktable 1, so that waste materials collected by the recess 3 is cleaned through the movable door 22.

According to the working principle of embodiments of the present disclosure, when the present apparatus is in use, a monocrystalline silicon wafer to be cut is placed on a moving plate 10, a first screw motor 8 is operated to drive the first screw 9 to rotate, the two moving plates 10 on the first screw 9 are moved, the two sides of the monocrystalline silicon wafer are clamped through cooperating with the fixing frame 11 on the moving plate 10, the control panel 2 controls the hydraulic cylinder 12 to operate, the hydraulic cylinder 12 clamps the upper surface of the monocrystalline silicon wafer from the upper end, the monocrystalline silicon wafer is fixed, the cutting process may be performed by a laser cutting machine, waste materials generated by the cutting falls on the surface of the rotatable table 4, the monocrystalline silicon wafer is removed after the cutting process is completed, the shaft 6 and the rotatable table 4 are driven by the rotating motor 7 to rotate one turn, the monocrystalline silicon wafer on the other side of the rotatable table 4 is cut, and the side of the rotatable table 4 after the cutting faces the bottom of the recess 3. The second screw motor 17 drives the second screw 16 to rotate so that the scraper plate 14 slides on the surface of the rotatable table 4 under the limit of the limiting rod 18, and scrapes the waste materials completely off the surface of the rotatable table 4, and the waste materials are left in the recess 3, thereby facilitating the collection of the waste materials by the above method. At the same time, while cleaning the waste materials, the monocrystalline silicon wafer on the other side is still being cut, thereby improving the cutting efficiency.

Based on the above, embodiments of the present disclosure have the following advantages:

1. In the present apparatus, a rotating motor is provided to drive a rotatable table to rotate by a shaft, a monocrystalline silicon wafer is cut on one side of the rotatable table, and waste materials on the surface of the rotatable table is cleaned by a scraper on the other side of the rotatable table, so that not only is it convenient to collect the waste materials generated during the cutting process, but also the cutting efficiency may be improved.
2. The present apparatus enables the moving plate to move on the first screw through the arrangement of the first screw motor and the first screw, and may fix the monocrystalline silicon wafers of different sizes by cooperating with the hydraulic cylinders on the fixing frame, which is simple to operate.

The basic principles, main features and advantages of the present disclosure have been shown and described above. It will be appreciated by those skilled in the art that the present disclosure is not limited to the above-described embodiments. The above-described embodiments and description merely illustrate the principles of the present disclosure. Various changes and modifications may be made to the present disclosure without departing from the spirit and scope of the present disclosure, which fall within the scope of the present disclosure as claimed. The scope of the present disclosure is defined by the appended claims and their equivalents.

What is claimed is:

1. A worktable for cutting a monocrystalline silicon wafer, wherein a control panel is fixedly mounted on an outer wall of the worktable, a recess is formed on an upper surface of the worktable, a rotatable table is provided in the recess, a shaft is fixedly connected to a middle portion of the rotatable table, each of upper and lower sides of the rotatable table is fixedly connected with a mounting plate, a clamper is provided on the mounting plate, and a scraper plate is provided on each of upper and lower surfaces of the rotatable table.

2. The worktable according to claim 1, wherein the shaft is rotatably mounted in the recess in the worktable, one end of the shaft penetrates the worktable and is fixedly connected to a rotating motor, and the rotating motor is fixedly mounted on an outside wall of the worktable.

3. The worktable according to claim 1, wherein the clamper comprises a first screw motor, the first screw motor is fixedly mounted on the mounting plate, a first screw is fixedly connected to an output shaft of the first screw motor, the first screw motor and the first screw are both disposed in two groups, the first screw is provided with two sections of external threads, and the two sections of external threads on the first screw are in opposite spiral directions.

4. The worktable according to claim 3, wherein each of the two sections of external threads of the first screw is threadedly attached with a moving plate, a fixing frame is fixedly connected to a surface of the moving plate, a hydraulic cylinder is fixedly mounted onto the fixing frame, and a clamping plate is fixedly connected to an end of a hydraulic rod of the hydraulic cylinder.

5. The worktable according to claim 1, wherein a lower surface of the scraper plate and said each of the upper and lower surfaces of the rotatable table are attached to each other, and connecting blocks are fixedly connected to both sides of the scraper plate, wherein one of the connecting blocks is threadedly connected to a second screw, the second screw is rotatably mounted in the rotatable table, the second screw is fixedly connected to a second screw motor, the second screw motor is fixedly mounted on an outside wall of the rotatable table, and another of the connecting blocks is slidably connected to a limiting rod, and the limiting rod is fixedly mounted in the rotatable table.

6. The worktable according to claim 5, wherein the surface of the rotatable table is provided with through recesses, the connecting blocks are slidably disposed in the through recesses, and one side of the through recess is fixedly connected with a stop bar.

7. The worktable according to claim 1, wherein supporting legs are fixedly connected to a lower surface of the worktable, and a movable door is movably connected to one side of a lower end of the worktable.

* * * * *